(12) United States Patent
Nishiura et al.

(10) Patent No.: US 8,594,492 B2
(45) Date of Patent: Nov. 26, 2013

(54) RECORDING APPARATUS AND REPRODUCING APPARATUS

(75) Inventors: Hiromi Nishiura, Fujisawa (JP); Akinobu Watanabe, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 793 days.

(21) Appl. No.: 12/331,836

(22) Filed: Dec. 10, 2008

(65) Prior Publication Data
US 2009/0148137 A1  Jun. 11, 2009

(30) Foreign Application Priority Data

Dec. 11, 2007  (JP) ................................. 2007-319059

(51) Int. Cl.
| H04N 5/92 | (2006.01) |
| H04N 5/14 | (2006.01) |
| H04N 5/93 | (2006.01) |
| H04N 7/167 | (2011.01) |
| H04N 9/80 | (2006.01) |
| G06F 13/00 | (2006.01) |
| G06F 15/16 | (2006.01) |
| G06F 21/00 | (2013.01) |
| G11B 5/09 | (2006.01) |

(52) U.S. Cl.
USPC ........... 386/326; 386/239; 386/241; 386/248; 386/279; 348/700; 348/701; 360/46; 369/47.13; 380/201; 705/57; 709/219; 711/105; 711/112; 711/170

(58) Field of Classification Search
USPC .................... 386/326, 241, 248, 279, E5.001, 386/E5.002, E9.009, 239; 358/296; 360/46; 369/47.13, 272.1; 380/201, 255; 705/57; 709/219; 711/105, 112, 170; 348/700, 701; 707/E17.028
See application file for complete search history.

(56) References Cited

U.S. PATENT DOCUMENTS

| 7,424,204 | B2 * | 9/2008 | Nakamura .................... 386/248 |
| 7,613,892 | B2 * | 11/2009 | Urushibara et al. ........... 711/170 |
| 7,773,864 | B2 * | 8/2010 | Eklund et al. ................. 386/241 |
| 2001/0043524 | A1 * | 11/2001 | Utsumi ...................... 369/47.13 |
| 2003/0026425 | A1 * | 2/2003 | Okamoto et al. ............. 380/255 |
| 2003/0191816 | A1 * | 10/2003 | Landress et al. .............. 709/219 |
| 2005/0024758 | A1 * | 2/2005 | Kamei ............................. 360/46 |
| 2006/0017980 | A1 * | 1/2006 | Yatabe et al. ................. 358/296 |
| 2008/0025690 | A1 * | 1/2008 | Kondo et al. .................... 386/46 |

FOREIGN PATENT DOCUMENTS

| JP | 2005-182931 | 7/2005 |
| JP | 2005-259201 | 9/2005 |
| JP | 2006-172656 | 6/2006 |

* cited by examiner

*Primary Examiner* — Thai Tran
*Assistant Examiner* — Syed Hasan
(74) *Attorney, Agent, or Firm* — McDermott Will & Emery LLP

(57) ABSTRACT

When scenes of a story are divided and dubbed to a plurality of recording media, the recording media are added with information about a total number of recording media used and sequential numbers of the recording media.

7 Claims, 9 Drawing Sheets

FIRST DISK

SECOND DISK

THIS DISK IS THE SECOND OF A SET OF THREE DISKS (150 MIN).

THIS DISK IS THE THIRD OF A SET OF THREE DISKS (150 MIN).

LOAD FIRST DISK.
THIS DISK IS THE THIRD OF A SET OF THREE DISKS (150 MIN).

THIS DISK IS THE THIRD OF A SET OF THREE DISKS (150 MIN).

RECORDING APPARATUS AND REPRODUCING APPARATUS

INCORPORATION BY REFERENCE

The present application claims priority from Japanese application JP2007-319059 filed on Dec. 11, 2007, the entire content of which is hereby incorporated by reference into this application.

BACKGROUND OF THE INVENTION

The present invention relates to a recording apparatus to record video-audio information on a recording medium and a reproducing apparatus to record video-audio information from the recording medium.

Nowadays, recorders and video cameras have spread widely which store video-audio information in large-capacity recording media, such as HDD. Moreover, already there are recorders and video cameras having a recording means compatible with both types of long-term storage media, HDD and DVD (Digital Versatile Disks).

The above-mentioned recorders and video cameras can store a large volume of video-audio information in the HDD, but their storage capacities have limits. The internal HDD is not detachable in most cases, and even when the HDD is detachable, the environments where those video recorders and cameras can reproduce video-audio products are limited, so that users sometimes find them inconvenient.

For this reason, a means is provided for dubbing information, which is recorded on a HDD, to optical disk media, such as DVD, BD (blue-ray Disk), and HD (High Definition)-DVD disks.

Video-audio information recorded on a HDD is sometimes too big to fit into one disk. In such a case, video-audio information is divided and dubbed in a plurality of disks as revealed in JP-A-2006-172656.

On the other hand, JP-A-2005-259201 discloses a technique that even when a user does not remember the reproduction sequence of a plurality optical disks on which the user recorded video-audio information by dividing it, by recording a sequential number on each optical disk for use in dubbing, the content can be reproduced in correct order.

JP-A-2005-182931 discloses a technique that a total length of recording time at the dubbing source and the start time and the end time of dubbing are additionally recorded on the optical disks, on which the content is divided and recorded, and when information is reproduced, the user can visually recognize information about at what part of data at the dubbing source the currently displayed image is located.

SUMMARY OF THE INVENTION

If video-audio information is divided and recorded on a plurality of optical disks, when the optical disks are reproduced, since heretofore there has not been information about a set of how many disks used and their sequential numbers, so that it is difficult to know them. Therefore, it happens that the user tends to watch only scenes dubbed to one optical disk and fail to watch the scenes that will appear in another optical disk without knowing it. It is difficult for the user to get the whole content in perspective from a single optical disk, and there has been demand that it should be made possible to grasp a general view of the content easily.

Particularly with video cameras, users record a large number of scenes in the hard disk in a short time and later repeatedly divide and dub the content into a plurality of optical disks. For example, when recorded information regarding a school athletic meet, the scenes of which parents took centering around their children, has been dubbed to a plurality of optical disks and these disks are reproduced, if the user does not remember how many disks there are besides the current disk, the user will be confused. Or, the user needs to know many more, such as he wants to know a total length of time of the original recorded information and also wants to get a general view of each disk. In other words, when the user divides and records a content into a plurality of disks and reproduces one of the optical disks, the user does not know where the image he is watching is in the whole content, and he has a difficulty in grasping the flow of all scenes and the relation among them. Needless to say, this is a prominent problem with the video cameras. In ordinary stationary recorders, this problem exists when the user records a movie, a drama, or a sports program and dubs it to optical disks or the like.

In recorders for dubbing to conventional DVDs, no consideration has been given to how information is recorded in BD format. With conventional DVDs, it has not been easy to change the layout and composition of images in a screen image or change visual effects, for example.

To solve the problems, the recording apparatus in the present invention adds information about a set of how many disks used and the sequential numbers of the disks to the optical disks as dubbing destinations.

By using a free space of each recording medium at each dubbing destination, digest information is recorded in a free space as a characteristic scene storage in the other recording media. Furthermore, a total length of time of the dubbing source and information about time of story section information and digest information is recorded.

Moreover, in a recording apparatus that can record video-audio information in a BD disk, digest information and time information mentioned above is stored as an image of IG (Interactive Graphics) or PG (Presentation Graphics) complying with BD format in a stream file in a BD disk.

According to the present invention, it is possible to provide a recording apparatus and a reproducing apparatus improved in ease of use and user-friendliness, which enables a user to easily get a general view of video-audio information when the information is divided and recorded in a plurality of disks.

BRIEF DESCRIPTION OF THE DRAWINGS

These and other features, objects and advantages of the present invention will become more apparent from the following description when taken in conjunction with the accompanying drawings wherein.

DESCRIPTION OF THE EMBODIMENTS

An embodiment of the present invention is described in the following.

First Embodiment

An example of a preferred embodiment for carrying out the present invention is described below. Note that the present invention is not limited to this embodiment.

Figure 1:
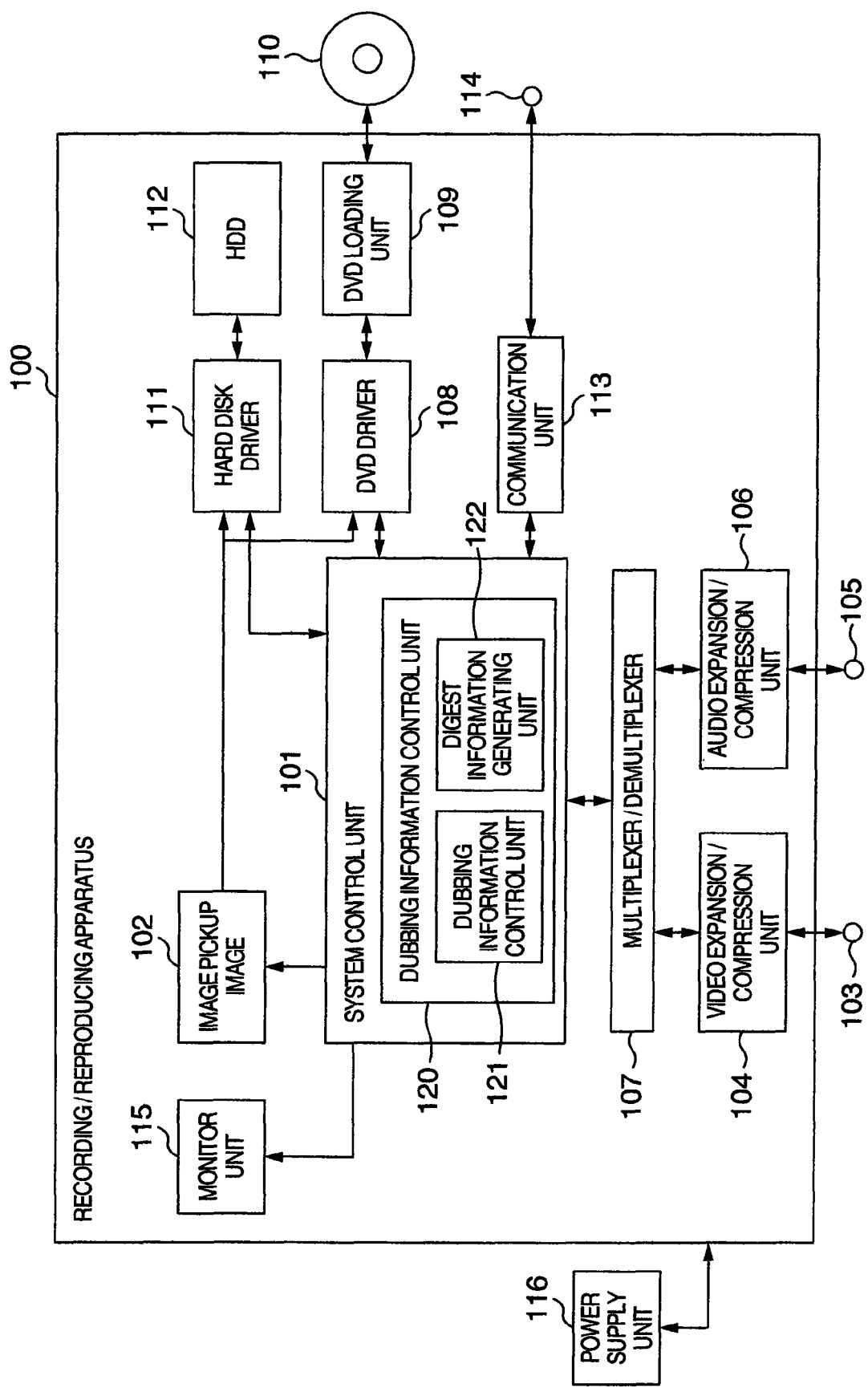
FIG. 1 is a recording/reproducing apparatus according to a first embodiment of the present invention.

FIG. 1 is a diagram illustrating an example of a recording/reproducing apparatus 100 as a general configuration of the present invention.

A system control unit 101 includes a CPU (Central Processing Unit) and a memory, and controls the whole system. An image pickup unit 102 takes images of a subject, converts image pickup unit information from an optical signal to an electric signal, and also converts an analog electric signal to a digital signal to a digital signal. An image input/output terminal 103 inputs and outputs a digital image signal, which is compressed or expanded by an image compression/expansion unit 104. An audio input/output terminal 105 inputs and outputs a digital audio signal compressed or expanded by an audio compression/expansion unit 106. A multiplex/demultiplex unit 107 generates stream data by multiplexing image compressed data and audio compressed data respectively output from the image compression/expansion unit 104 and the audio compression/expansion unit 106, or separates stream data into video compressed data and audio compressed data, and inputs the video and audio data into the video compression/expansion unit 104 and the audio compression/expansion unit 106.

A DVD loading unit 109 can load and eject a DVD 110 freely. When AV data is recorded, a DVD driver 108, under control of the system control unit 101, writes stream data generated by the multiplex/demultiplex unit 107 and various kinds of information files on the DVD 110 in a specified format. When AV data is reproduced, the DVD driver 108 reads out stream data and various kinds of information files recorded on the DVD 110.

When AV is recorded, a hard disk driver 111, under control of the system control unit 101, writes stream data generated by the multiplex/demultiplex unit 107 and various kinds of information files on a hard disk 112 in a specified format. Or when AV data is reproduced, reads out stream data and various kinds of information files recorded on the hard disk 112. The video compression/expansion unit 104, the audio compression/expansion unit 106, the multiplex/demultiplex unit 107, the DVD driver 108, and the hard disk driver 111 may be configured either by hardware, such as circuits to execute operations, or by software by storing a program in the system control unit 101 to execute processes.

The DVD 110 and the hard disk 112 store video-audio information in a digitally compressed form, and management information for video-audio information, above all else.

A dubbing information control unit 120, under control of the system control unit, controls dubbing information between the HDD and a DVD. A dubbing information calculation unit 121 calculates information required for dubbing. A digest information generating unit 122 generates digest information of the content for dubbing.

A communication unit 113 performs a process of communication with other devices, such as an information processing device, through a communication input/output terminal 114.

A monitor unit 115 displays GUI (Graphic User Interface) images, such as a menu of the recording/reproducing apparatus 100, and displays video information input by the image pickup unit 102 during recording, or video information reproduced from a DVD or the hard disk during reproduction.

A power supply unit 116, such as a battery or an AC power supply, supplies electric power to the recording/reproducing apparatus.

Figure 2:
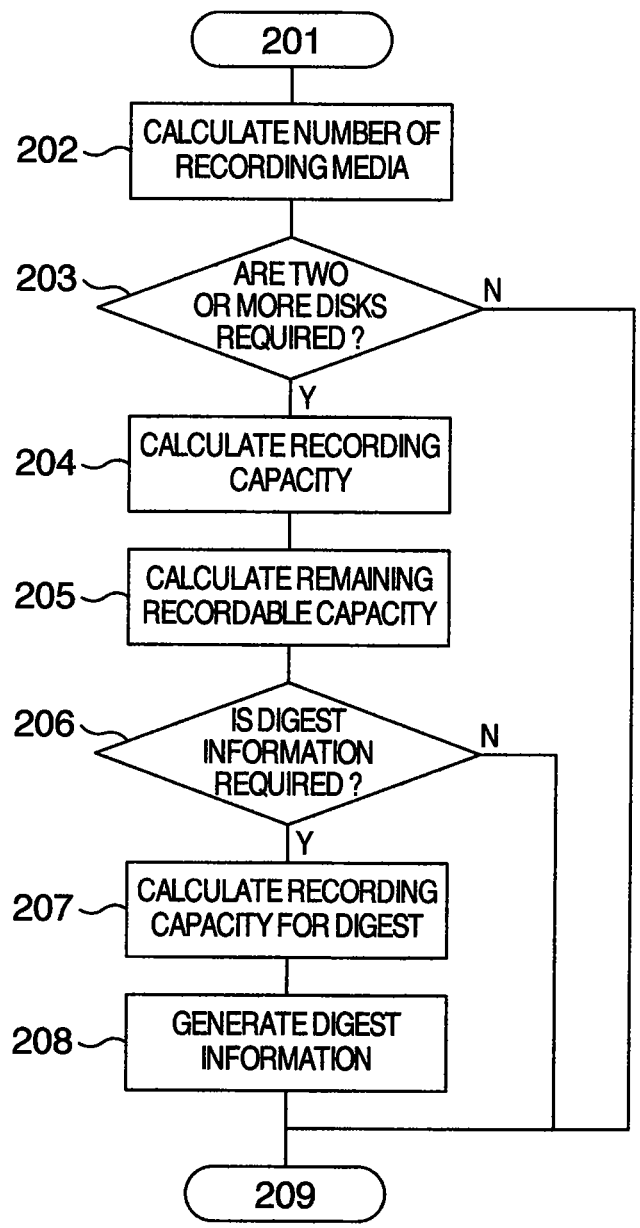
FIG. 2 is a dubbing flow according to the first embodiment of the present invention.

FIG. 2 illustrates a flow of dubbing execution according to the first embodiment.

In step 202, a number of recording media required for dubbing execution is calculated. In step 203, it is determined whether the required number of recording media is two or more, and if the required number is one, the process proceeds to step 209. If the required number is two or more, the process advances to step 24. In step 204, a capacity for recording information on a recording medium is calculated. In step 205, a recordable free space is calculated from a recordable capacity of the recording medium and the capacity for recording information to a single piece of the recording medium calculated in step 204. In step 206, it is determined whether digest information is to be added to the recording media as dubbing destinations. When digest information is added, the process goes on to step 207. When digest information is not added, the process moves on to step 209. In this case, since time required to add digest information is saved, dubbing time can be shortened. In step 207, a capacity for recording digest information is calculated from the recordable free space calculated in step 205 and the number of recording media required. In step 208, digest information is generated equivalent to the capacity for digest information calculated in step 207. This digest information is preserved till the end of dubbing on all recording media to prevent it from becoming necessary to generate the digest information again when a content is dubbed to a plurality of recording media.

Figure 3A:
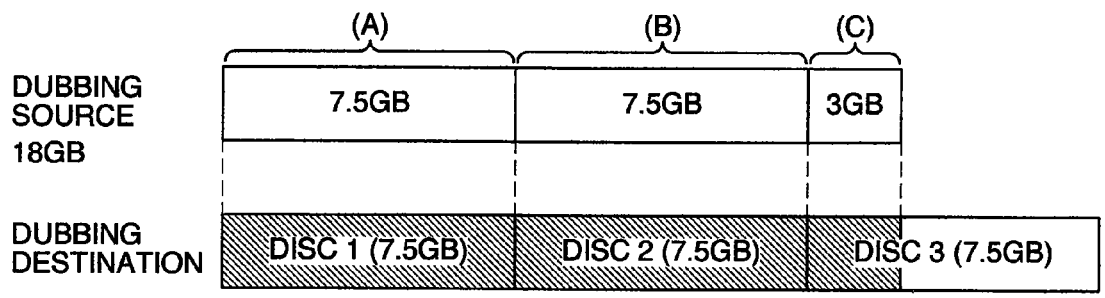
FIG. 3A is diagram showing a method of calculating number of disks for dubbing according to the first embodiment of the present invention.
Figure 3B:
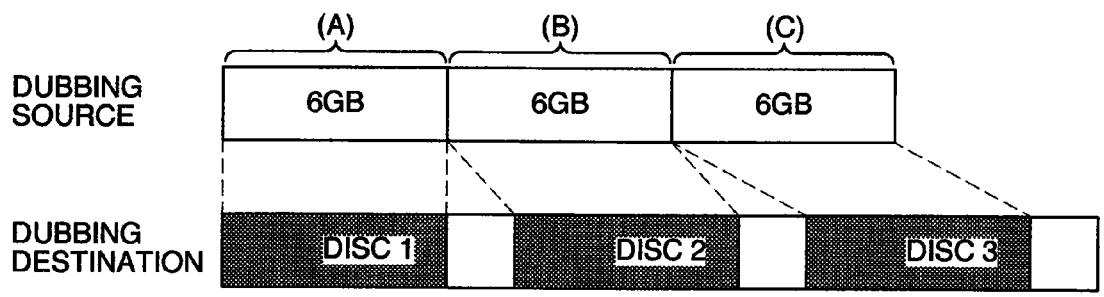
FIG. 3B is diagram showing a method of dividing scenes according to the first embodiment of the present invention.

FIGS. 3A and 3B illustrate an example showing a method of dividing a content when the scenes of a content at the dubbing source are too big to fit into the recording capacity of the recording medium as the dubbing destination and it is necessary to divide the content at the dubbing source when the content is recorded. Let us suppose that the scene capacity at the dubbing source is 18 GB and a single piece of the recording medium at a dubbing destination is 7.5 GB.

FIG. 3A illustrates a method of calculating the number of recording media used when a content is dubbed by dividing the scenes as shown in step 202. Assuming that data of 7.5 GB is recorded in the first and second recording media respectively and 3 GB data is recorded on the third one, a total of three recording media are required.

FIG. 3B illustrates a method of dividing the scenes in step 204. In FIG. 3A, it is calculated that three pieces of recording media are required. Thus, a 18 GB scene capacity at the dubbing source is divided into three disks and 6 GB each is recorded in each recording medium as the dubbing destinations, and 6 GB each is recorded on each recording medium.

This is because a free space of 7.5 GB−6 GB=1.5 GB is provided for each disk, in which space digest information about the other disks is recorded. In step 205, the above-mentioned free space is calculated.

In FIG. 3A, the number of disks required was calculated on the assumption that the recordable capacity or each recording medium as a dubbing destination would be utilized to the fullest. However, it may be calculated that the number of disks required is four in total by setting an upper limit for the recordable capacity for dubbing on each recording medium as the dubbing destination. More specifically, the upper limit is set at 5 GB, for example, and 5 GB data each is recorded on the first, second and third disks, and 3 GB is recorded on the fourth disk.

In FIG. 3B, the recording capacity for each disk is decided by dividing the capacity for scenes at the dubbing source by the number of disks required. However, it is possible to allow the user to set a capacity for each recording medium and select the scenes. If segmented processing is allowed, and if a user can continue filming of children's school athletic meet all day by using a video camera produced pursuant to the present invention, the user can select the recording capacities and the scenes in segmented dubbing by, such as allocating a first disk to the morning round, and a second disk to the afternoon round, which makes the video camera user-friendly.

Figure 4:
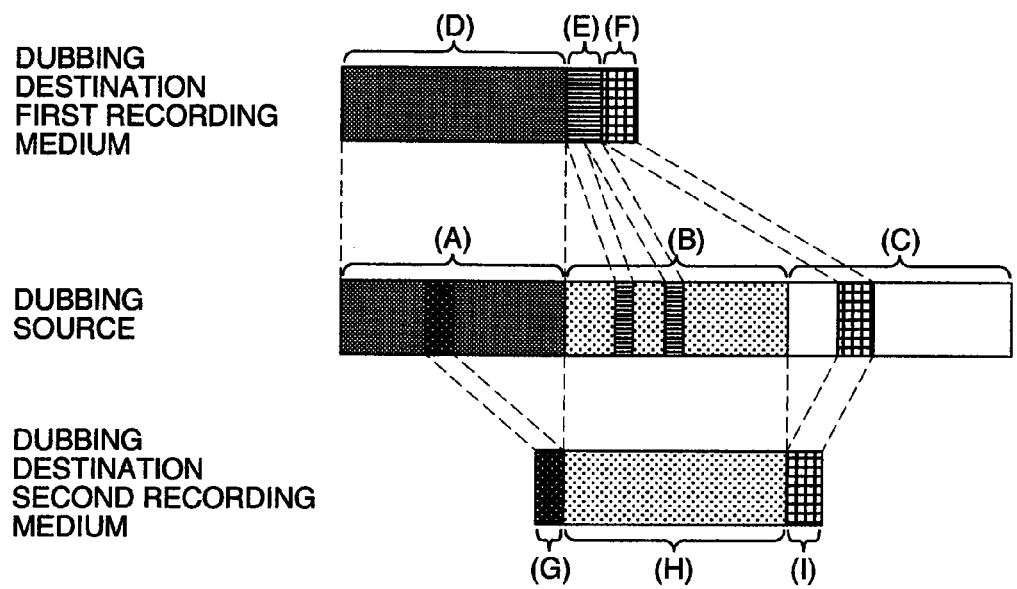
FIG. 4 is diagram showing a breakdown of a recording media at dubbing destinations according to the first embodiment of the invention.

FIG. 4 shows a breakdown of the contents recorded on the first disk in the case shown in FIGS. 3A and 3B.

A part (A) of the dubbing source, for which a decision is made to record on the first disk in FIG. 3, is dubbed to a part (D) of the first recording medium. Digest scenes of a part (B) of the dubbing source are recorded to a part (E). A digest scene of a part (C) of the dubbing source is recorded on a part (F) of the first recording medium.

As described, by recording digest scenes of the information recorded in another recording medium, the user can easily get a general view of a content in the dubbing source, and also readily understand relations between the divided parts of the information. By getting a clue from digest information of another recording medium, the user can prevent himself from forgetting to view another recording medium.

Figure 5:
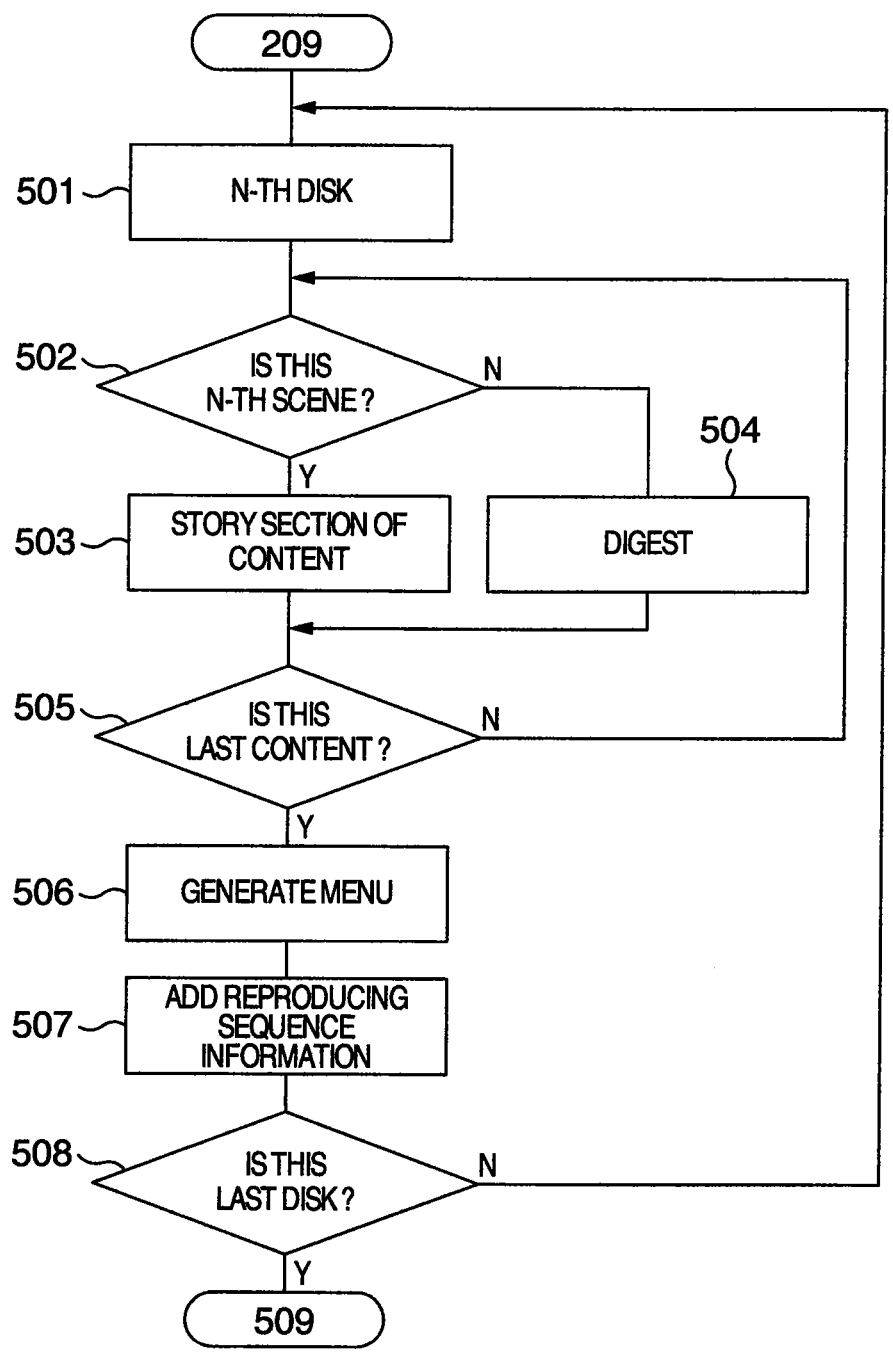
FIG. 5 is a flow of determining a dubbing sequence according to the first embodiment of the present invention.

FIG. 5 shows a flow of determining a dubbing sequence when dubbing to recording media. In step 501, information is held about what is the sequential number of a recording medium in a set of how many recording media, to which information is dubbed. In step 502, a decision is made what is the sequential number of a scene which is recorded. When the recording medium is an Nth medium one and an Nth scene is recorded, the process advances to step 503, and a story section is recorded on it. In cases other than as described above, the process goes on to step 504 and a relevant digest scene is recorded. In step 505, a decision is made whether the scene is the last scene. If the scene is the last scene, the process advances to step 506. If there is a next scene, the process moves on to step 502.

In step 506, a menu image information is generated and added. This menu image information includes information to display what is the sequential number of a set of how many recording media, or information about what part of a total length of time this scene is. In step 507, reproducing sequence information is added. In step 508, a decision is made if this is the last recording medium. If the scene is the last one, the process goes on to step 509, with which dubbing is finished. If the scene is not the last scene, the process advances to step 501 and dubbing is performed on the next recording medium.

In step 502, 503, 504 or 505, reproducing sequence information may be generated simultaneously.

Figure 6A:
FIGS. 6A and 6B are diagrams showing information about reproduction sequence according to the present invention.
Figure 6B:

FIGS. 6A and 6B illustrate an example of reproducing sequence information, in which FIG. 6A shows a reproducing sequence of the first recording medium and FIG. 6B shows a reproducing sequence of the second recording medium.

Regarding the first recording medium of FIG. 6A, the story section on the first recording medium is reproduced at the start, the recording area of which corresponds to the part (D) in FIG. 4. After the content has been reproduced, a digest fraction of the scenes dubbed onto the second recording media is reproduced, the recording area of which corresponds to the part (E) in FIG. 4. After the digest fraction has been reproduced from the second disk, the digest fraction dubbed onto the third disk is reproduced, the recording area of which corresponds to the part (F) in FIG. 4.

In the second recording medium of FIG. 6B, a digest fraction of the scenes dubbed onto the first recording medium is reproduced, the recording area of which corresponds to the part (G) in FIG. 4. After the digest fraction has been reproduced, the story section on the second recording medium is reproduced, the recording area of which corresponds to the part (H) in FIG. 4. After the story section on the second recording medium has been reproduced, the digest fraction of the scenes dubbed onto the third recording medium is reproduced, and its recording area corresponds to the part (I) in FIG. 4.

By making an arrangement such that the digest fractions and the story section can be reproduced in time sequence order as described above, the reproduction order of the disks is easily understandable, thus reducing burden to the user. The user can intuitively understand the sequential order of disks, and get a general idea of the content during reproduction. Furthermore, the user may select the reproduction order of the disks.

Figure 7A:
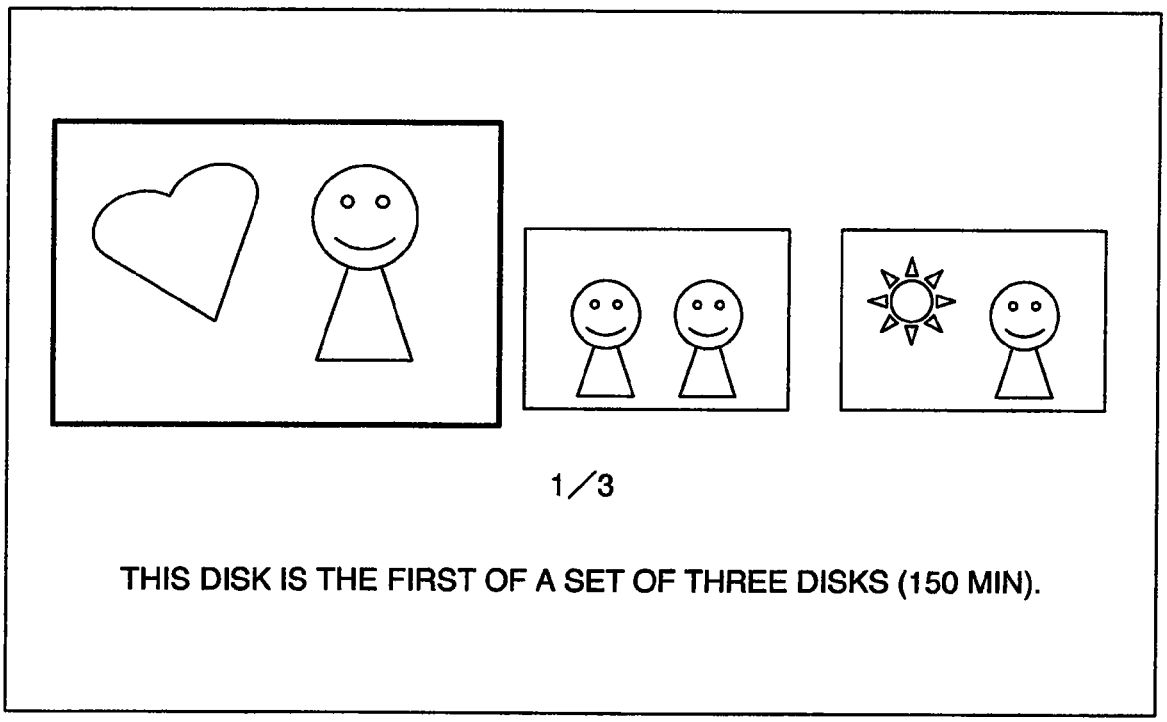
FIG. 7A illustrates an example of a menu image in a first recording medium according to the first embodiment of the present invention.
Figure 7B:
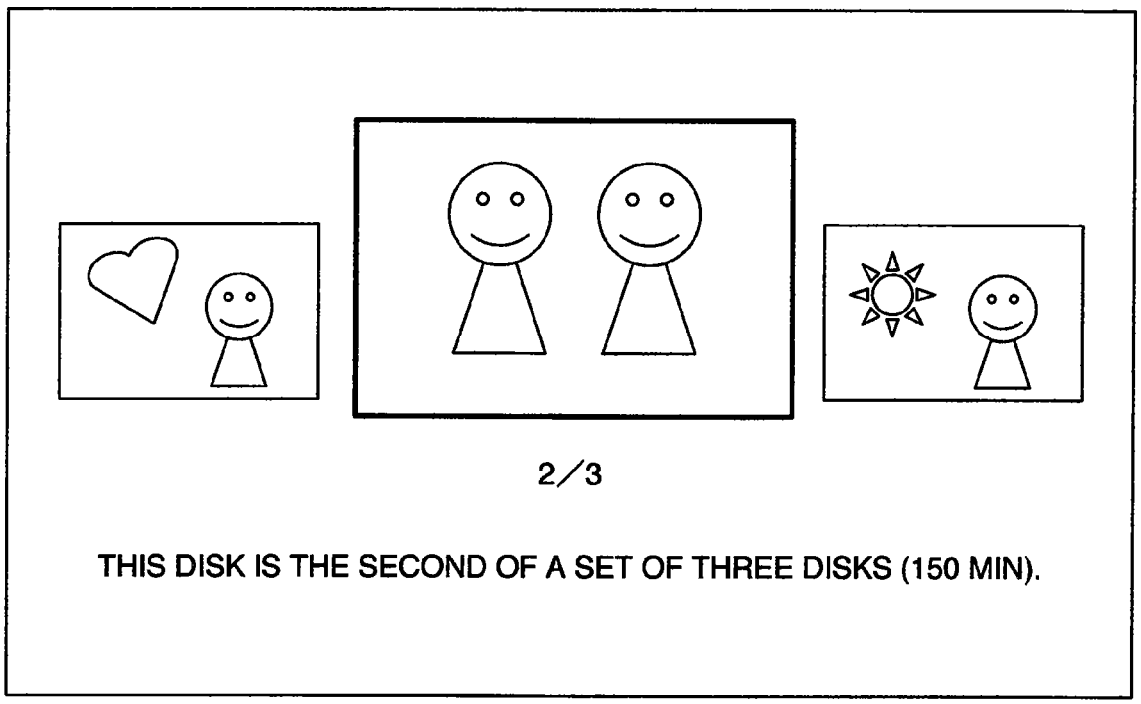
FIG. 7B illustrates an example of a menu image in a second recording medium in a second recording medium according to the first embodiment of the present invention.
Figure 7C:
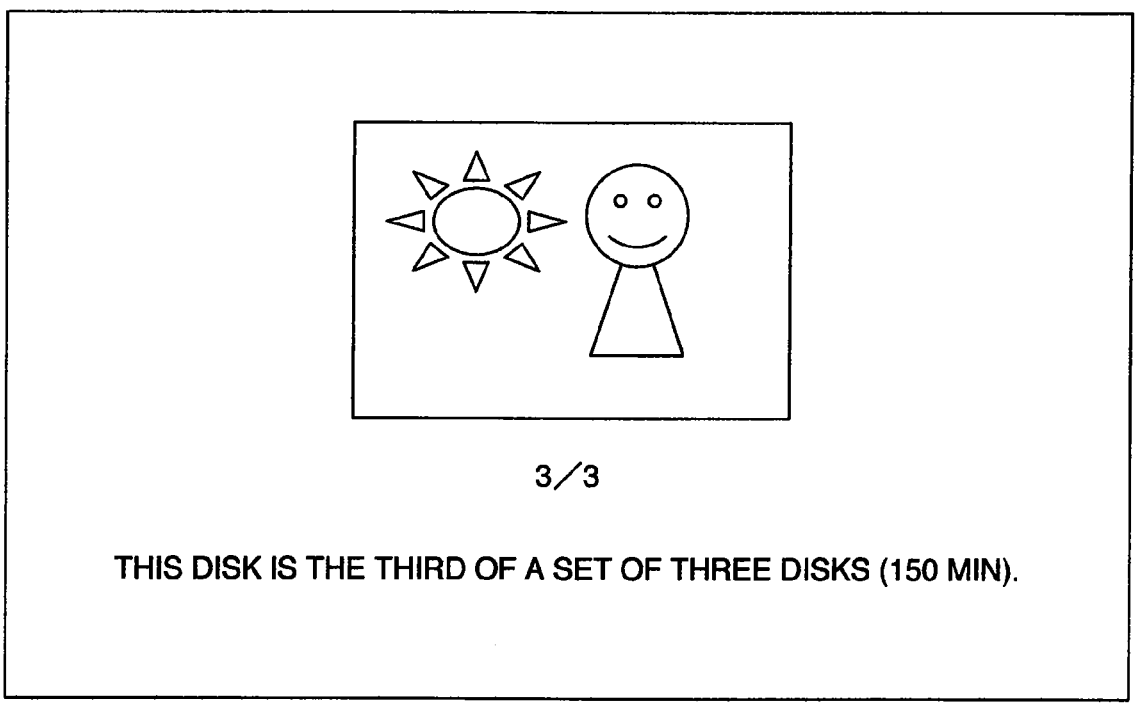
FIG. 7C illustrates an example of a menu image in a third recording medium in a third recording medium according to the first embodiment of the present invention.

FIGS. 7A to 7C show examples of menu images. FIG. 7A illustrates an example of menu image of the first recording medium. This drawing shows a down-sized image of the story section and down-sized images of digest fractions on the first recording medium in the order of their reproduction. The reproduction order may be this order or another order the user specifies. For example, "⅓" indicates that this disk is the first of a set of three disks. Or it is possible to write "⅓" or "The first disk of a set of three disks".

By adding to each disk with information about the sequential number of the disk, the reproduction order of disks becomes easily understandable, thus lessening burden to the user during reproduction.

By adding to each disk with information about a set of how many disks, the user can easily get information about the number of disks that form a particular set during reproduction, so that the user can be prevented from forgetting to view some disk.

It is possible to show a total length of time of a story section consisting of three disks by writing "First disk of a set of three disks (150 min)".

FIG. 7B illustrate an example menu image of the second recording medium, which includes a reduced-size image of a story section and reduced-size images of digest fractions on the second recording medium in the order reproduction. Unlike the first recording medium, the image indicates that this recording medium is the second of a set of three recording media.

Here, the reduced-size image of the story section is shown larger than the other reduce-size images, but the image may be surrounded by a frame or added with a mark to emphasize that this is where the story section of the second recording medium is located.

It is possible to make an arrangement that the story section or digest scenes can be reproduced by selecting any of the reduced-size images on the menu screen image.

As in the menu image on the third recording medium in FIG. 7C, instead of displaying the reduced-size images of digest fractions, the user may display only the reduce-size image of the content and information about what sequential number of a set of how many recording media this recording medium is, for example.

Figures 8, 9:
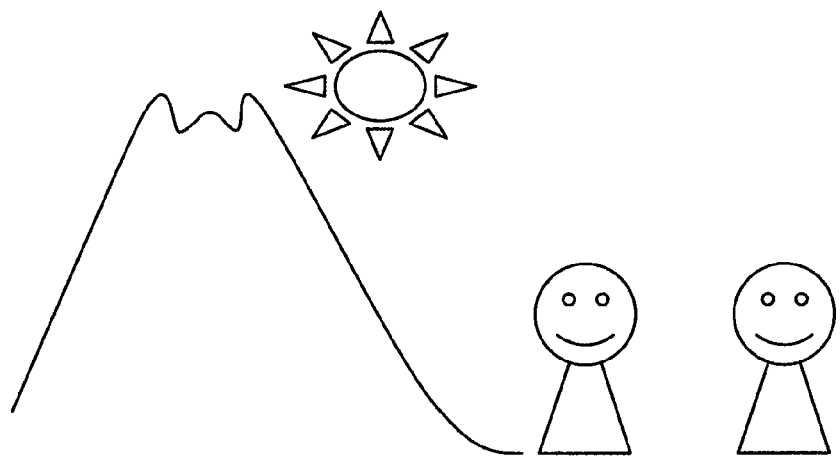
FIG. 8 illustrates a display example of recording medium information according to the first embodiment of the present invention.
FIG. 9 illustrates a display example of recording medium information according to the first embodiment of the present invention.

When a reduced-size image of a digest scene is selected, instead of the digest scene, a message may be displayed to the effect that a desired scene exists in another disk, in other words, a message "Load the first disk" may be displayed as shown in FIG. 8. In this case, a digest scene may or may not have been recorded on the recording medium being currently reproduced.

FIG. 9 illustrates an example when caption information or information about the recording medium as information that can be superposed on the image is displayed. For example, information about "What is the sequential number of this disk?" can be displayed by the user's operation.

Figure 10:
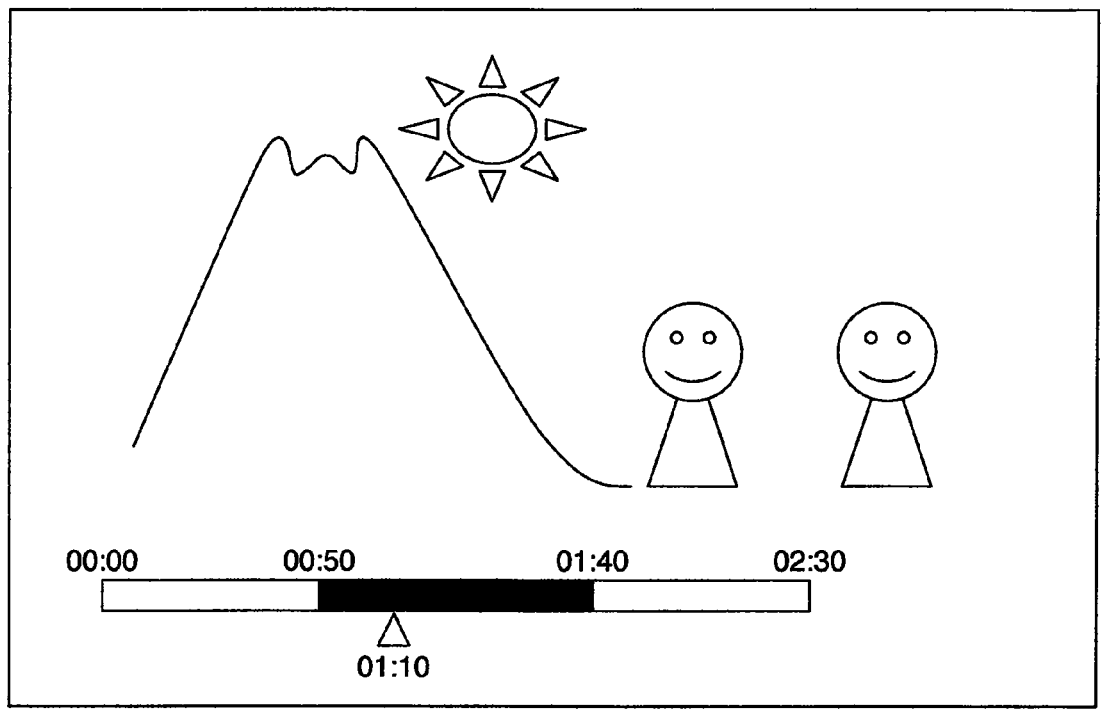
FIG. 10 illustrates a display example of recording medium information according to the first embodiment of the present invention.

FIG. 10 illustrates an example of information about what is the sequential number of the second disk on time basis.

Though, in FIG. 9, information about "This is the second disk of a set of three disks" is displayed, a bar indicates the progress of time on a time scale in FIG. 10. The total length of the scenes at the dubbing source is 150 min. (2 hours and 30 min.) and the bar shows from "00:00" till "02:30" to "02:30".

Because the disk being currently reproduced is the second disk, the bar indicates that the currently displayed disk runs from "00:50" to "01:40" by changing the color along that period. The point the image is reproduced at the moment is indicated as "01:10".

By displaying the sequential number of each disk by time, the user can intuitively and easily obtain information as to what part of the whole scenes is being reproduced.

Figure 11:
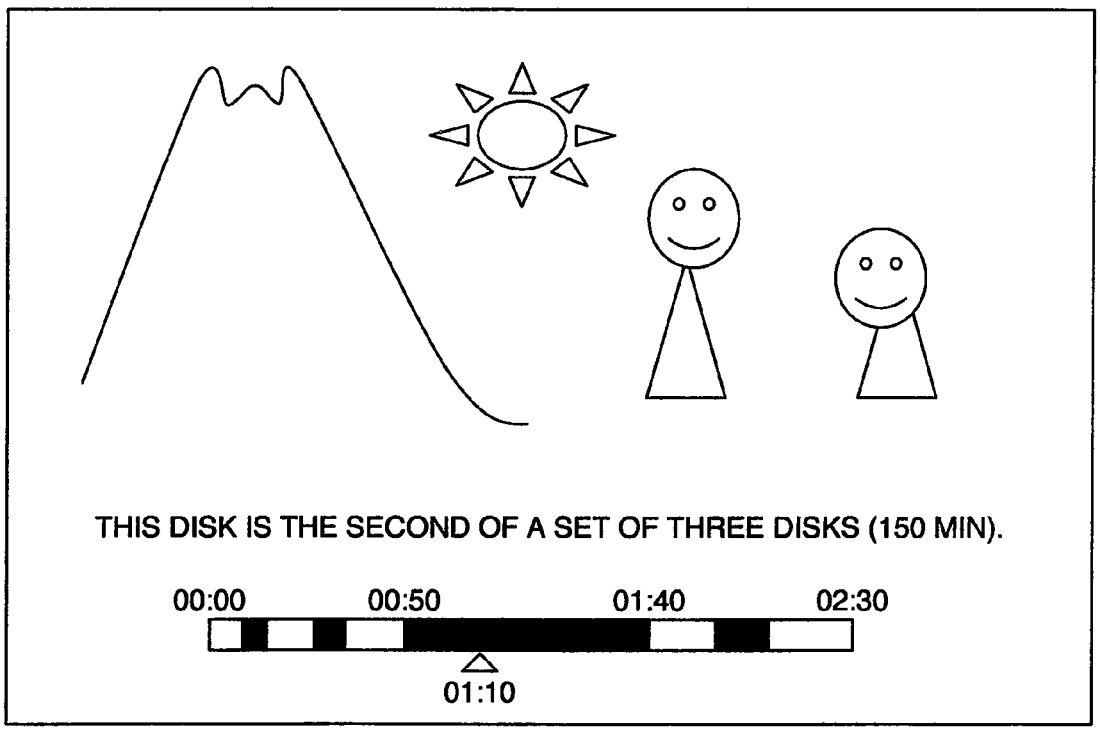
FIG. 11 illustrates a display example of recording medium information according to the first embodiment of the present invention.

FIG. 11 illustrates an example of displaying time information of the recording media when reproducing the second recording medium on which the digest scenes of the first and third recording media have been recorded.

In this case, in addition to time information of the scene of a story section recorded on the second recording medium, time information of the scenes of the first and third recording media is displayed. More specifically, in addition to recording the digest scenes from the other recording media, on which the content is recorded by being divided, by additionally recording time information of the digest scenes as displayed in the image in FIG. 11 for example, the time information is displayed when the digest scenes are reproduced. Therefore, the user can visually acquire information as to in what time zone of the whole content the currently displayed scene is located when the user reproduces the digest scenes, and it is easy to get a general view of the content only from one disk, the effect of which is to prevent user from forgetting to view another other recording medium.

Needless to say, those pieces of display information may be superposed and displayed only when there is a request from the user without displaying them in ordinary reproduction.

Figure 12:
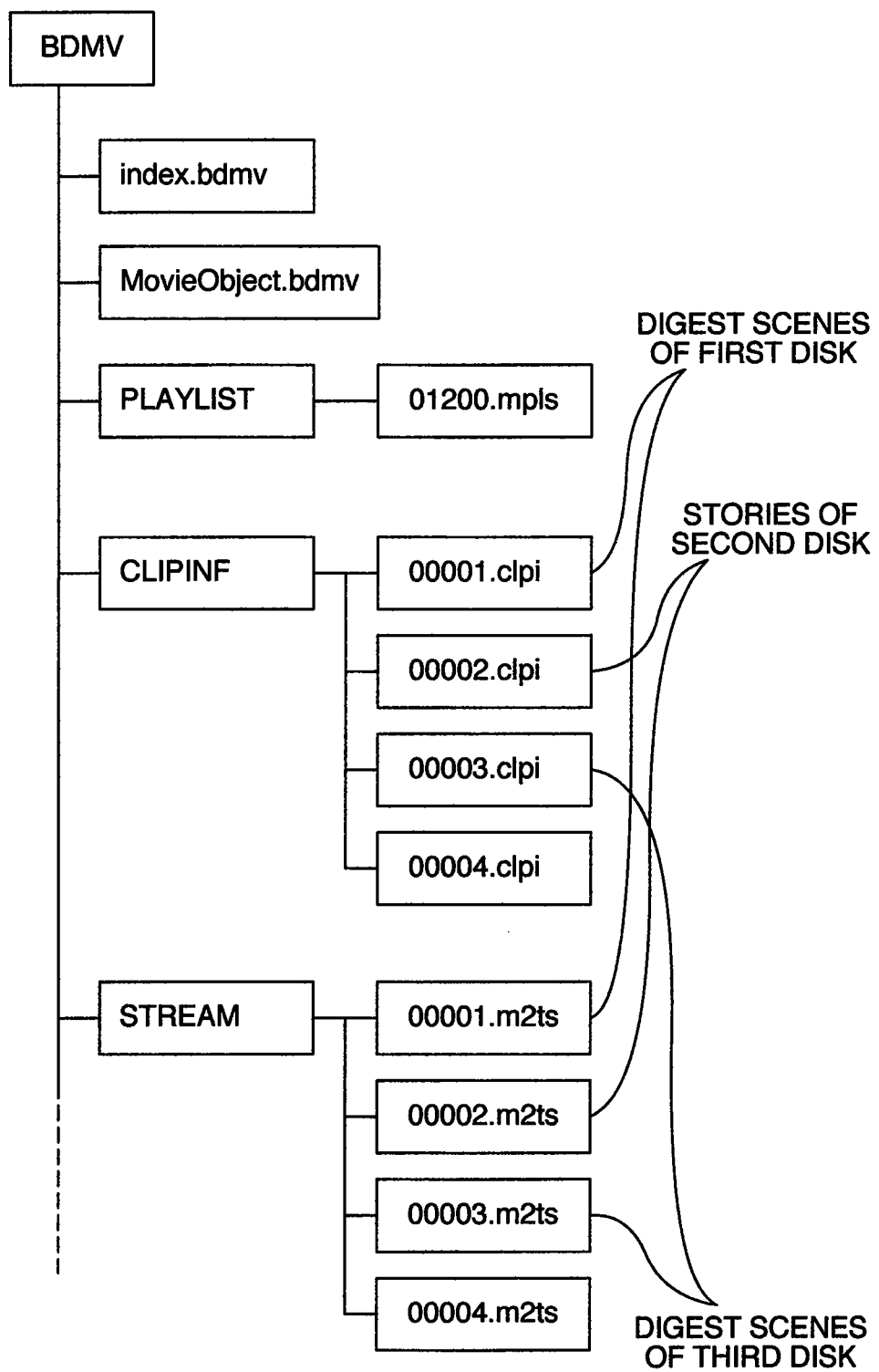
FIG. 12 illustrates a display example of recording medium information according to the first embodiment of the present invention.

FIG. 12 illustrates an example of file configuration of the disks at the dubbing source when the present invention is applied to a BD (Blue-ray Disk) camera. In this case, description will be made of the second disk as an example. Management information for digest scenes of a content dubbed to the first disk is written in 00001.clpi, management information for the content on the second disk is written in 00002.clpi, and management information for the digest scenes of the content dubbed onto the third disk is written in 00003.clpi in the CLIPINF directory. In addition, stream information of the digest scenes of the content dubbed to the first disk is written on the first disk is written in 00001.m2ts, stream information of the content on the second disk is written in 00002.m2ts, and management information for the digest scenes of the content dubbed to the third disk is written in 00003.m2ts in the STREAM directory. Management information for a menu image is written in 00004.clpi and stream information is written in 00004.m2ts of the STREAM directory.

A playlist is set in 01200.mpls, for example, so that the digest scenes on the first disk, the story section on the second disk, and the digest scenes on the third disk are reproduced sequentially in this order.

As stream information described above, thumbnails and background images that form caption information or a menu image presenting information about time and the number of recording media are recorded on recording media when data is recorded with a BD camera using the above-mentioned format.

Those items of information are stored in a stream file as an IGP (Interactive Graphics Plane) or a PGP (Presentation Graphics Plane). When used as thumbnails for a menu screen, an IGP enables the user to switch to the story section or digest scenes. A PGP can display a message about the number of disks as caption information.

On an IGP or PGP, the user can make use of visual effects on a menu image or caption information, such as changing the layout and composition of images or colors, fade-out, or scroll, which are fairly advantageous both to the content suppliers and viewers.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

The invention claimed is:

1. A recording apparatus for recording video-audio information, comprising:
   a recording module configured to record video-audio information on a first recording medium and a plurality of second recording media;
   a dividing module configured to divide the video-audio information recorded in the first recording medium such that the divided video-audio information has a size not more than recordable capacity of the second recording media;
   a digest information generation module configured to generate digest information by extracting a part of each video-audio information divided by the dividing module;

a dubbing module configured to dub the video-audio information divided by the dividing module by copying or transferring the video-audio information to a plurality of second recording media;

an information adding module configured to add the second recording media with information about a total number of the second recording media and sequential numbers of the second recording media out of the total number thereof, the information being required when the video-audio information is dubbed to the plurality of second recording media by the dubbing module; and an extracting and dubbing module for dubbing the digest information to one of the second recording media which is extracted out of the video-audio information dubbed to a different recoding medium other than the one second recording medium among the plurality of the second recording media among the digest information retained until after finishing dubbing to the pre-generated plurality of second recording media by the digest information generating module.

2. The recording apparatus according to claim 1, wherein the extracting and dubbing module is configured to extract part of a video-audio information to be dubbed to another second recording medium different from one second recording medium out of the plurality of second recording media, and dub the partial information to the one second recording medium, the above-mentioned information being included in the video-audio information divided by the dividing module.

3. The recording apparatus according to claim 1, further comprising a menu image generating module which generates a menu image when the second recording medium having the video-audio information dubbed thereon by the dubbing module is reproduced; and a menu image adding module which adds the menu image to the second recording medium, wherein the menu image shows information about a total number of the second recording media and sequential numbers of the second recording media out of the total number thereof, the information being required when the video-audio information is dubbed onto the plurality of second recording media by the dubbing module.

4. The recording apparatus according to claim 2, further comprising a menu image generating module which generates a menu image when the second recording medium having the video-audio information dubbed thereon by the dubbing module is reproduced; and a menu image adding module which adds the menu image to the second recording medium, wherein the menu image shows information about a total number of the second recording media and sequential numbers of the second recording media out of the total number thereof, the information being required when the video-audio information is dubbed onto the plurality of second recording media by the dubbing module.

5. The recording apparatus according to claim 2, further comprising a superposed information adding module which adds information about a total number of the second recording media and sequential numbers of the second recording media out of the total number thereof, the information being required when the video-audio information is dubbed onto the plurality of second recording media by the dubbing module, a total time of the video-audio information recorded on the first recording medium before being divided by the dividing module, and time information of the video-audio information recorded on the second recording media by the dubbing module and the extracting and dubbing module.

6. The recording apparatus according to claim 5, wherein the recording apparatus is capable of recording on a BD (Blue-ray Disk) and further comprises a storing module which stores information added to the second recording media by the superposed information adding module as an IGP (Interactive Graphics Plane) or a PGP (Presentation Graphics Plane) in a stream file.

7. A reproducing apparatus for reproducing a recording medium having video-audio information recorded thereon, comprising:

a reproducing module which reproduces video-audio information; and a control module configured to control the reproducing module to reproduce information by having an image of information about a number of recording media used and time information superposed on a reproduced image of information about a story section of content or digest information recorded on a recording medium when the reproducing module reproduces the recording medium storing the digest information of the video-audio information divided, the video-audio information being divided such that the divided video-audio information has a size not more than a recordable capacity of the second recording media, and recorded on the plurality of recording media, information about a total number of recording media having the video-audio information divided and recorded thereon, recording-medium-number information, including sequential numbers of the total number of the plurality of recording media, and time information about a total length of time of the video-audio information before being divided, a length time of the video-audio information recorded, and a length of time of the digest information.

* * * * *